United States Patent
De Kimpe et al.

(10) Patent No.: US 9,506,155 B2
(45) Date of Patent: *Nov. 29, 2016

(54) HOT TEST FLUID CONTAINING VAPOR PHASE INHIBITION

(75) Inventors: Jurgen P. De Kimpe, Gent (BE); Serge S. Lievens, Merelbeke (BE)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/293,839

(22) Filed: Nov. 10, 2011

(65) Prior Publication Data

US 2012/0286196 A1 Nov. 15, 2012

Related U.S. Application Data

(63) Continuation-in-part of application No. PCT/US2010/033120, filed on Apr. 30, 2010, which is a continuation of application No. 12/473,043, filed on May 27, 2009, now abandoned.

(51) Int. Cl.
| | |
|---|---|
| *C09K 5/00* | (2006.01) |
| *C23F 11/10* | (2006.01) |
| *C09K 5/04* | (2006.01) |
| *C09K 3/18* | (2006.01) |
| *C09K 5/10* | (2006.01) |
| *C23F 11/02* | (2006.01) |
| *C23F 11/08* | (2006.01) |
| *C23F 11/18* | (2006.01) |

(52) U.S. Cl.
CPC ............... *C23F 11/10* (2013.01); *C09K 3/18* (2013.01); *C09K 5/04* (2013.01); *C09K 5/10* (2013.01); *C23F 11/02* (2013.01); *C23F 11/08* (2013.01); *C23F 11/187* (2013.01)

(58) Field of Classification Search
CPC .......... C09K 5/00; C09K 5/04; C09K 5/048; C09K 5/066; C09K 5/20; C09K 3/18

USPC ........... 252/70, 71, 73, 74, 75, 76, 77, 78.1, 252/78.3, 78.5, 79

See application file for complete search history.

(56) References Cited

U.S. PATENT DOCUMENTS

| | | | | |
|---|---|---|---|---|
| 5,019,340 | A * | 5/1991 | Mohr et al. ................. | 422/7 |
| 6,676,847 | B2 * | 1/2004 | Turcotte ................. | C23F 11/08 252/73 |
| 6,802,988 | B1 * | 10/2004 | Wenderoth et al. ............ | 252/73 |
| 2002/0030177 | A1 * | 3/2002 | Turcotte ................. | C09K 5/20 252/71 |
| 2004/0029754 | A1 * | 2/2004 | Wenderoth ............... | C09K 5/20 510/185 |
| 2004/0227124 | A1 * | 11/2004 | Turcotte ................. | C23F 11/08 252/71 |
| 2005/0040362 | A1 * | 2/2005 | Wenderoth ............ | C23F 11/145 252/79 |
| 2007/0158612 | A1 * | 7/2007 | Maes ........................ | C09K 5/10 252/71 |
| 2007/0241306 | A1 * | 10/2007 | Wehner .................... | A61Q 5/02 252/67 |
| 2008/0017828 | A1 * | 1/2008 | Wenderoth ............ | C23F 11/145 252/77 |
| 2008/0149883 | A1 * | 6/2008 | Kormann ................. | C09K 5/10 252/75 |
| 2010/0210492 | A1 * | 8/2010 | Lange ....................... | C10L 1/14 508/221 |
| 2010/0270493 | A1 | 10/2010 | De Kimpe et al. | |
| 2010/0270494 | A1 | 10/2010 | De Kimpe et al. | |

* cited by examiner

*Primary Examiner* — Jane L Stanley
(74) *Attorney, Agent, or Firm* — Melissa M. Hayworth; Mary R. Bram; Steven R. Ellinwood

(57) ABSTRACT

This invention covers a formulation providing protection against corrosion in liquid and vapor phase. Such formulations are used in applications where engine parts or fuel cell systems are subjected to a "running-in" or "hot-test" prior to final assembly or storage. The invention includes a concentrate as well as a dilute solution. The synergistic combination of inorganic ammonium derivatives in combination with monocarboxylic or dicarboxylic acids increases the period of protection. This enables storage for a longer period when the engine parts are shipped or stored prior to assembling. The use of the described invention pre-conditions the metal surface and provides protection even if afterwards the liquid is almost completely removed.

14 Claims, No Drawings

HOT TEST FLUID CONTAINING VAPOR PHASE INHIBITION

REFERENCE TO RELATED APPLICATIONS

This application claims priority as a continuation-in-part of International Application PCT/US2010/033120 filed 30 Apr. 2010, which claims priority to U.S. patent application Ser. No. 12/473,043 filed 27 May 2009. It is noted that U.S. patent application Ser. No. 12/473,043 is a continuation-in-part of U.S. patent application Ser. No. 12/428,249, filed 22 Apr. 2009.

TECHNICAL FIELD

This invention relates to a formulation that provides protection against forms of corrosion when in both the liquid and vapor phase.

BACKGROUND

Combustion engines such as gasoline, diesel or gas engines, as well as the more modern fuel cell systems go through, following the production process, a "running-in" or "hot-test" phase prior to final parts assembly. This running-in phase varies in length from several minutes to a few hours, depending on the type of engine and the operation it will face later on. The "running-in" phase is used to guarantee the functionality of the engine or the system. Today's running-in fluids are quite diverse. They range from pure water over coolant to oil emulsions. Most demonstrate some sort of technical disadvantage.

When putting together the parts after the running-in phase, different means of operation can be used. In many cases, however, the engine builders centralize their production. Following initial testing parts may be shipped all over the world prior to being built into a final operating configuration. During this storage and transport time, the parts may come in contact with corrosive conditions. They require protection against the negative influences faced during storage and/or transport. For economical reasons, the running-in fluid is almost completely removed from the part prior to it going into storage.

This way of operation means that standard coolant formulations do not provide optimal protection to a part following the running-in phase, when it is being stored or transported. Most of the current formulations provide no sustained protection when not in direct contact with the surface they need to protect. Using a standard coolant formulation as hot test fluid is certainly viable in situations where the parts are directly built in after testing. In modern economic climates, however, this is seldom the case. Combined storage and transport time periods have been observed from 3 months to up to 9 months. What is needed is a formulation useful in protecting a part from corrosion following the "running-in" phase and prior to final installation.

In modern combustion engines in particular, thermal loads have high requirements with regard to the materials used. Any form of corrosion, even minor forms, results in a potential risk factor and can lead to a reduction of the lifetime of the engine and correspondingly, safe vehicle operation. In addition, the increased number of different metals and alloys used is increasing, making the system more susceptible to corrosion, particularly on those places where the different parts or alloys make direct or indirect contact with each other.

Corrosion problems increase if transport or storage occurs in cold conditions and freezing point depressants are necessary. Examples of optional freezing point depressants are glycols, small chain organic acids and low molecular weight alcohols. These include but are not limited to ethylene glycol, propylene glycol, diethylene glycol, glycerin and salts of formic acid, salt of acetic acid, salt of propionic acid, salt of adipic acid and glycerol. To be used in cooling systems, they are mixed with water to ensure good heat transfer in addition to freezing protection. Those water based mixtures are however, corrosive under the operating conditions typically found in the targeted applications. Therefore the different metals and corresponding alloys present in the cooling system need to be sufficiently protected from the different corrosion processes like pitting, crevice corrosion, erosion or cavitation.

Oil emulsions can provide protection to parts for a fuel cell system in transit. There are some incompatibility issues which occur when the coolant is added, however. Although the soluble oil provides some residual corrosion protection, it will decrease the heat transfer in engine or fuel cell system by forming a heat isolating, although protective layer. Because efficient heat removal is essential, certainly in the more powerful engines that comply with the more modern environmental legislation, the running-in fluid should not negatively affect the heat transfer from the parts into the cooling system.

Coolants are necessary to remove heat from the engine. To give the engine optimal efficiency, the excess heat must be removed as fast as possible without damaging or decreasing the operation of all cooling system parts. Much work and effort has been expended for the protection of the cooling system materials, especially towards the protection against corrosion at high temperatures. Although from a corrosion standpoint high temperatures can be damaging, there can also be issues at low temperatures during engine operation. At low temperatures, solubility and pumpability can be of concern.

Ideally the coolant remains transparent and free of insolubles. Haziness, precipitation or, in extremes, gel formation are considered detrimental for the performance of an engine coolant. Problems resulting from instability can be seen in damage to water pump seals, engine head seals, hoses or any other parts where softer materials are in use. Gel formation, on the other hand, negatively impacts viscosity, resulting in a decrease in the heat transfer characteristics of the fluid. Heat transfer capability is the main requirement of a coolant fluid. Because the risk for coolant instability is maximized at low temperatures, most problems occur under cold start conditions.

Many antifreeze compositions are known which may contain a variety of ingredients. U.S. Pat. No. 6,802,988, for example discloses an antifreeze concentrate which comprises alkylene glycol in combination with a mixture of at least two dicarboxylic acids or their salts, alkali metal or ammonium molybdates, as well as triazole or thiazole corrosion inhibitors.

U.S. 2002/0030177 A1 discloses a glycol based additive for corrosion prevention further comprising carboxylie acid, azoles, molybdates, polyvinyl, pyrrolidone and a nitrite salt.

SUMMARY OF THE INVENTION

The stability effect of organic acids in synergistic combination with an inorganic ammonium salt, demonstrated in this invention, is novel. Water is the preferred solvent in this invention, due to its toxicological benefits in comparison with the glycols. Many patents describe explicitly the use of freezing point depressants when trying to provide vapor phase protection after running-in cycle. The current invention provides sufficient protection in the vapor phase as well as in the liquid phase, even without the addition of a freezing point depressant. In case freezing point depressant is needed it can, of course, be added and an even improved performance will be noticeable. This is highlighted in the Examples section, with Comparative Examples 1 and 2.

DETAILED DESCRIPTION OF THE INVENTION

The instant invention preferably employs water as solvent, and combines the positive characteristics from both coolants and oil emulsions. It has the excellent compatibility with coolants added subsequently, and does not negatively affect heat transfer characteristics, as would an oil emulsion. It also provides sustainable corrosion protection during the running-in period as well as during subsequent storage, when most of the product has been drained. Best results are observed when the part is sealed or air flow is not completely free. This allows the additives to come to equilibrium and condition the atmosphere so corrosion protection is guaranteed during storage or transport.

One embodiment of the invention may be a concentrate used to prepare a running-in or hot test fluid. It may be diluted as a second embodiment. Alternatively also a freezing protection base fluid like an alcohol or short chain organic acid can be added for those situations where freezing protection would be needed during storage or transport.

The addition of a liquid with increased viscosity relative to water to provide freeze protection further improves the protection level during storage and or transport. As those freezing depressant fluids have a higher viscosity and are considered to be slippery, they are not preferred unless freeze protection is really needed. Freezing point depressant may be present in the range from 10 to 60 vol %, preferably in the range from 30 to 50 vol %. A liquid alcohol or organic salt freezing point depressant component can be added to provide freezing protection. The freezing point depressant can contain polyalcohols such as ethylene glycol, di-ethylene glycol, propylene glycol, di-propylene glycol, and glycerin and glycol monoethers such as the methyl, ethyl, propyl and butyl ethers of ethylene glycol, di-ethylene glycol, propylene glycol and di-propylene glycol. Ethylene and propylene glycol are particularly preferred as the freezing point depressant component. Non-limiting examples of organic acid salt as freezing point depressant include esters of carbrexylic acids, including formiate, acetate, propionate, adipate or succinate or combinations thereof.

Alternatively additional coolant additives such as silicates, nitrites, nitrates, phosphates, molybdates, anti-oxidants, thiazole derivatives, triazoles, polyacrylates, phosphonates and borates can be used to provide protection in the water phase.

Examples of optional additional coolant are the typical coolant additives. These include but are not limited to silicates, nitrites, nitrates, phosphates, molybdates, anti-oxidants, thiazole derivatives, polyacrylates, phosphonates and borates that can be used to provide protection in the water phase.

EXAMPLES

Example 1

Comparative Example

A running fluid was prepared comprising a major amount of ethylene glycol, 1.6 weight percent 2-ethyl hexanoic acid, 0.1 weight percent sebasic acid and 0.1% tolyltriazole and brought to a pH of 8.3.

Example 2

Comparative Example

A running fluid was prepared comprising a major amount of water, 1.6 weight percent 2-ethyl hexanoic acid, 0.1 weight percent sebasic acid and 0.1% tolyltriazole and brought to a pH of 8.3.

Note: Example 1 and 2 differ from each other only in the replacement of ethylene glycol by water. See results in the Table.

It has been observed that by combining carboxylic acids with non-organic ammonium compounds like ammonium bicarbonate, or other non-organic ammonium products a good corrosion protection is present not only in the liquid phase but also a good corrosion protection is present towards the metals above the liquid level.

Example 3

Comparative Example

A running fluid was prepared comprising a major amount of water, 1.4 weight percent isononanoic acid, 0.1 weight percent sebasic acid and 0.1% tolyltriazole and brought to a pH of 8.3.

Example 4

Demonstration of Current Invention

A running-in fluid was prepared comprising a major amount of water, 1.4 weight percent isononanoic acid, 0.1 weight percent sebasic acid, 0.1% tolyltriazole and 0.1 weight percent ammonium bicarbonate and brought to a pH of 8.8.

Example 5

Comparative Example

A running-in fluid was prepared comprising a major amount of water, 1.4 weight percent isononanoic acid, 0.1 weight percent sebasic acid, 0.1% tolyltriazole and 0.01 weight percent ammonium bicarbonate and brought to a pH of 8.8.

Example 6

Demonstration of Current Invention

A running-in fluid was prepared comprising a major amount of water, 1.4 weight percent isononanoic acid, 0.1 weight percent sebasic acid, 0.1% tolyltriazole and 0.05 weight percent ammonium bicarbonate and brought to a pH of 8.8.

Example 7

Demonstration of Current Invention

A running-in fluid was prepared comprising a major amount of water, 1.4 weight percent isononanoic acid, 0.1 weight percent sebasic acid, 0.1% tolyltriazole and 1.0 weight percent ammonium bicarbonate and brought to a pH of 8.8.

Example 8

Demonstration of Current Invention

A running-in fluid was prepared comprising a major amount of water, 1.4 weight percent isononanoic acid, 0.1 weight percent sebasic acid, 0.1% tolyltriazole and 5.0 weight percent ammonium bicarbonate and brought to a pH of 8.8.

Example 9

Comparative Example

A running-in fluid was prepared comprising a major amount of water, 1.4 weight percent isononanoic acid, 0.1 weight percent sebasic acid, 0.1% tolyltriazole and 0.1 weight percent ammonium bicarbonate and brought to a pH of 6.0.

Example 10

Comparative Example

A running-in fluid was prepared comprising a major amount of water, 1.4 weight percent isononanoic acid, 0.1 weight percent sebasic acid, 0.1% tolyltriazole and 0.1 weight percent ammonium bicarbonate and brought to a pH of 8.2.

Example 11

Demonstration of Current Invention

A running-in fluid was prepared comprising a major amount of water, 1.4 weight percent isononanoic acid, 0.1 weight percent sebasic acid, 0.1% tolyltriazole and 0.1 weight percent ammonium bicarbonate and brought to a pH of 9.7.

Example 12

Demonstration of Current Invention

A running-in fluid was prepared comprising a major amount of water, 1.4 weight percent isononanoic acid, 0.1 weight percent sebasic acid, 0.1% tolyltriazole and 0.1 weight percent ammonium bicarbonate and brought to a pH of 12.0.

Example 13

Comparative Example, Based on Preferred Embodiments Disclosed in Prior Art

A concentrate containing: 3 w % 2-ethylhexanoic acid; 0.175 w % Sodium nitrate; 0.45 w % Sodium nitrite; 0.6 w % stabilized silicate; 0.25 w % tolyltriazole; 0.3 w % polyvinylpyrolidone (15%); 0.03 w % defoamer; 0.05 w % ammonium molybdate; potassium hydroxide (45 w %) as pH controlling set to pH at 8.7 and rest monoethylene glycol. This concentrate is diluted with two volume of water before testing.

Example 14

Comparative Example, Based on Preferred Embodiments, Disclosed in Prior Art A concentrate containing: 1.75 w % succinic acid; 1.75 w % sebacic acid; 0.3 w % ammonium molybdate; 0.15 w % tolyltriazole; 0.15 w % benzotriazole; 0.6 w % benzoic acid; 1 w % water sodium hydroxide (50 w %) as pH controlling set to pH at 8.2 and rest monoethylene glycol. This concentrate is diluted 40 vol % with water before testing.

Test Method

To enable the evaluation of the running-in fluid, the following screening method was used. 100 ml of the targeted liquid was put into a glass vial containing a cast iron alloy coupon used in ASTM D-1384 glassware corrosion testing of coolants. The vial with content was placed in the oven for 1 hour at 90° C. After removal from the oven, the vial was allowed to cool down for 8 hours to room temperature. Seventy percent of the liquid was then removed, resulting in a partially immersed metal specimen. The partially immersed metal specimen remained for 1 hour at room temperature prior to being placed in an oven at 50° C. After this, the vial remained was refrigerated at 4° C. for 1 hour. The vial was taken out and placed at room temperature. The cycle 50° C. to 4° C. and back to room temperature was repeated again. Afterward, the metal samples were examined for corrosion. They were also examined for the position in the liquid as well as for the position in the vapor. The Table provides the results, demonstrating that the invention Examples provide the best corrosion protection in both the liquid and vapor phase.

TABLE 1

| Results | | | | | | | |
|---|---|---|---|---|---|---|---|
| | Ex 1 | Ex 2 | Ex 3 | Ex 4 | Ex 5 | Ex 6 | Ex 7 |
| Result liquid phase | 1 | 1 | 1 | 1 | 1 | 1 | 1 |
| Result vapor phase | 2 | 3 | 3 | 1 | 3 | 2 | 1 |
| | Ex 8 | Ex 9 | Ex 10 | Ex 11 | Ex 12 | Ex 13 | Ex 14 |
| Result liquid phase | 1 | 3 | 1 | 1 | 1 | 1 | 1 |
| Result vapor phase | 1 | 3 | 3 | 2 | 2 | 3 | 3 |

Legend
1 as new
2 superficial corrosion
3 heavily corroded

It is notable that the best performance is both the liquid and vapor phases occurred in Examples 4, 7, and 8. Examples 13 and 14, which are based on preferred embodiments cited in prior art, show heavy corrosion in the vapor phase.

We claim:

1. A glycol free coolant fluid providing anti-corrosion properties in both the liquid and vapor phases during the "running-in" phase of an engine, said fluid comprising ammonium bicarbonate present in the range from about 0.05 wt % to about 10 wt %, at least one carboxylic acid present in a range of from about 0.2 wt % to about 15 wt %, and water present in a range of from about 50 wt % to 95 wt % and not including a glycol as a freezing point depressant.

2. The fluid of claim 1, wherein the ammonium bicarbonate is present in an amount from about 0.05 wt % to below 5 wt %.

3. The fluid of claim 2, wherein the ammonium bicarbonate is present in the range from 0.05 to 2 wt %.

4. The fluid of claim 1, which further comprises a freezing point depressant that is an organic salt.

5. The fluid of claim 4, wherein the organic salt is selected from the group consisting of formiate, acetate, proprionate, adipate, succinate, and combinations thereof.

6. The fluid of claim 1, wherein the at least one carboxylic acid is selected from the group consisting of monocarboxylic acids, dicarboxylic acids, aliphatic monocarboxylic acids, aliphatic dicarboxylic acids, branched carboxylic acids, aromatic unbranched carboxylic acids, aromatic branched carboxylic acids, and combinations thereof.

7. The fluid of claim 1, wherein the fluid has a pH of 8.8 to 12.0.

8. The fluid of claim 1, wherein the at least one carboxylic acid is isononanoic acid.

9. The fluid of claim 1, wherein the at least one carboxylic acid is a mixture of an aliphatic monocarboxylic acid and an aliphatic dicarboxylic acid.

10. The fluid of claim 1, wherein the at least one carboxylic acid comprises a mixture of isononanoic acid and sebacic acid.

11. The fluid of claim 1, further comprising a coolant additive selected from the group consisting of silicates, nitrates, phosphates, anti-oxidants, thiazole derivatives, triazole, polyacrylates, phosphonates, borates, and mixtures thereof.

12. The fluid of claim 11, wherein the coolant additive is a triazole.

13. The fluid of claim 12, wherein the triazole is tolyltriazole.

14. A process for protecting a metal surface from corrosion comprising pre-conditioning the surface with a glycol free coolant fluid comprising anti corrosion properties in both the liquid and vapor phases, the fluid comprising ammonium bicarbonate present in the range from about 0.05 wt % to about 10 wt %, at least one carboxylate acid which is present in a range of from about 0.2 wt % to about 15 wt %, and water present in a range of from about 50 wt % to 95 wt % and not including a glycol as a freezing point depressant.

* * * * *